W. W. WYMORE.
NUT LOCK.
APPLICATION FILED NOV. 2, 1915.
1,270,357.
Patented June 25, 1918.
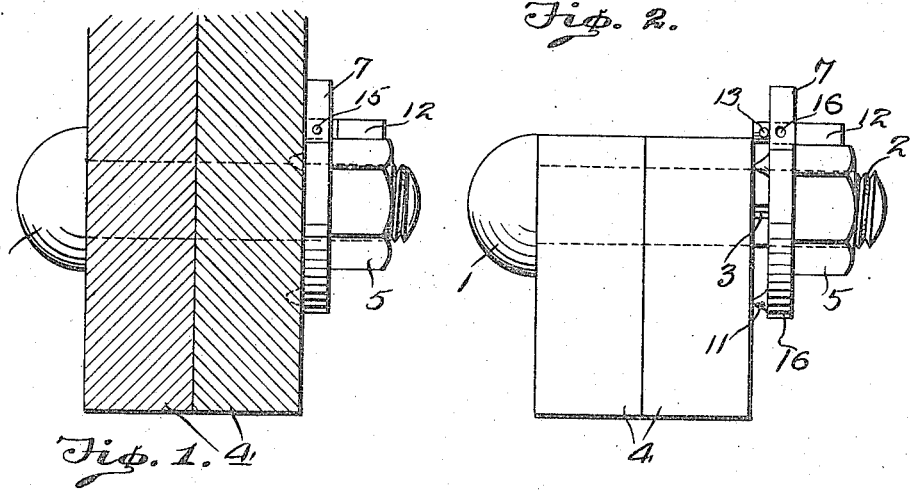
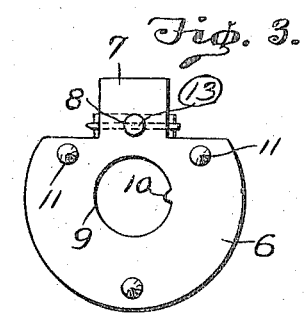
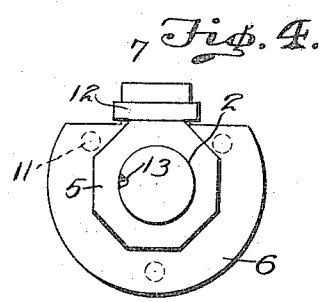
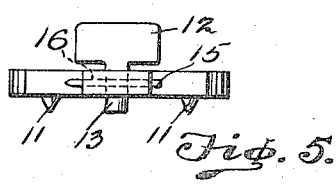
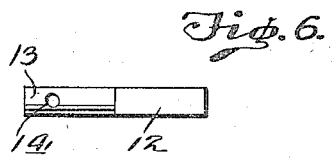
WITNESSES
Edw. S. Hall.
INVENTOR
William W. Wymore.
BY Richard Owen.
ATTORNEY

UNITED STATES PATENT OFFICE.

WILLIAM W. WYMORE, OF MARMARTH, NORTH DAKOTA.

NUT-LOCK.

1,270,357.

Specification of Letters Patent.  Patented June 25, 1918.

Application filed November 2, 1915. Serial No. 59,268.

*To all whom it may concern:*

Be it known that I, WILLIAM W. WYMORE, a citizen of the United States, residing at Marmarth, in the county of Billings and State of North Dakota, have invented certain new and useful Improvements in Nut-Locks, of which the following is a specification.

My invention relates to nut locks and the principal object of my invention is to provide a nut lock capable for use in connection with a bolt and nut of the ordinary type, the bolt being slightly modified in so far that a longitudinal groove is provided therein to prevent the turning of said bolt.

Another object of the invention is to provide a nut lock which is simple in construction, cheap to manufacture, strong and durable, and effective in use.

With the above and other objects in view my invention resides preferably in the construction, combination, and arrangement of parts as hereinafter set forth in the specification and illustrated in the accompanying drawings, in which—

Figure 1 is a side elevation of a nut lock embodying the improvements of my invention, showing the same in locked position.

Fig. 2 is a similar view showing the invention in position when used in connection with metal work.

Fig. 3 is a bottom plan view of the locking washer.

Fig. 4 is a top plan view of my invention showing the same associated with a nut and bolt.

Fig. 5 is an edge view of the locking washer.

Fig. 6 is a detail elevational view of the locking key.

Similar reference characters indicate similar parts throughout the various views of the drawings.

In the drawings, wherein the preferred embodiment of my invention is illustrated, a bolt of the usual type is shown having a head 1 and a threaded portion 2. Said bolt is provided with a longitudinal groove 3. Objects to be held are designated 4, the objects shown being merely illustrative of one use to which the invention may be put. A nut 5 is shown threaded on said bolt and need not be modified in any manner to operate with my invention.

My invention includes a locking washer 6 having the marginal edges cut away to provide a lug 7 having a lateral opening 8 therein for reception of a locking key described hereinafter. The locking washer 6 is provided with a central aperture 9, the peripheral surface having extending therefrom a lug 10 for engagement in the groove 3 formed in the bolt. A plurality of projections 11 are provided on the under surface of the washer 6 and are adapted to impinge upon an object to be held whereby to prevent rotation of the washer and bolt. The locking key is designated 12 and is provided with a stem 13 for reception in the opening 8. A transverse opening 14 may be provided in the stem for reception of a transverse key 15 when said key 12 is placed in the opening 8.

In Fig. 1 my invention is shown applied in position on a bolt serving to secure objects which are of a soft material such as wood and the like. In this instance the projections 11 puncture the surface of the object and thereby prevent rotation of said washer. In this instance the pin 15 may be passed through a transverse opening 16 in the lug 7, which opening communicates with the opening 8.

In Fig. 2 the invention is shown applied in position on articles of metal and other relatively hard materials. In this instance, the projections 11 may only engage the surface of the objects to be held in order to prevent turning of the washer. However, it has been found that the frictional engagement of the projections will be sufficient to prevent rotation of the washer, these projections in some cases very slightly biting into the surface of the objects to be held and thereby preventing rotation. When the washer has been placed in position, the nut may be screwed home. The stem of the key is now inserted in the opening 8 and in the form shown in Fig. 2 the pin 15 must be passed through the opening 14 back to the inner surface of the washer 6. This will effectively prevent dislodgment of the key, it being shown to advantage in Fig. 4 that said key is adapted to abut one of the surfaces of the nut 5 and thereby prevent rotation.

From the above description taken in connection with the accompanying drawings, it is thought that a clear and comprehensive understanding of the construction, operation and advantages of my invention may be readily gathered, and while, I have shown and described my invention as possessing a peculiar form and construction, it is desired that it be understood that I may make such changes in the details thereof that do not depart from the spirit and scope of the invention as claimed.

Having thus described my invention, what I claim and desire to secure by Letters Patent is:

In a nut lock of the class described, the combination of a bolt having a nut screwed thereon, a thickened locking washer positioned upon said bolt, said washer having pointed projections upon its inner surface, said nut engaging said washer for holding said projections in engagement with a support, thus holding said washer against rotation, said washer having its edges cut away to form substantially parallel outwardly extending portions, thus forming an elongated outwardly extending lug, said lug having a lateral opening projecting therethrough, said lug also having transverse openings projecting therethrough and registering with said lateral opening, a flat locking key having a reduced stem projecting therefrom, said stem having a transverse opening formed therethrough, said lug projecting beyond the periphery of said nut, said flat key bearing upon one of the side surfaces of said nut, said stem projecting through the lateral opening of said lug, a transverse pin passing through said lug and said stem, thus holding said locking key and washer in a set engagement with each other, said pin holding said stem from rotating, thus causing said flat key to bear upon the nut and hold the same from rotating, thus positively locking said nut upon said bolt.

In testimony whereof I affix my signature in presence of two witnesses.

WILLIAM W. WYMORE.

Witnesses:
IDA DE LANGE,
FRANK F. DE LANGE.

Copies of this patent may be obtained for five cents each, by addressing the "Commissioner of Patents, Washington, D. C."